US008996975B2

(12) United States Patent
Adams

(10) Patent No.: US 8,996,975 B2
(45) Date of Patent: *Mar. 31, 2015

(54) ENHANCED BROWSER NAVIGATION

(75) Inventor: Neil Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 352 days.

This patent is subject to a terminal disclaimer.

(21) Appl. No.: 13/470,581

(22) Filed: May 14, 2012

(65) Prior Publication Data
US 2012/0226968 A1  Sep. 6, 2012

Related U.S. Application Data

(63) Continuation of application No. 12/040,417, filed on Feb. 29, 2008, now Pat. No. 8,201,075.

(51) Int. Cl.
G06F 17/00 (2006.01)
G06F 17/30 (2006.01)

(52) U.S. Cl.
CPC .............................. *G06F 17/30905* (2013.01)
USPC ........................................................ 715/206

(58) Field of Classification Search
CPC .................. G06F 17/30696; G06F 17/30716; G06F 17/30873; G06F 17/30887; G06F 17/3002; G06F 17/3028; G06F 17/3089
USPC ........................... 715/205, 206, 208, 255, 273
See application file for complete search history.

(56) References Cited

U.S. PATENT DOCUMENTS

| | | | | | |
|---|---|---|---|---|---|
| 5,710,918 | A | * | 1/1998 | Lagarde et al. | 1/1 |
| 5,826,267 | A | * | 10/1998 | McMillan | 1/1 |
| 6,021,416 | A | * | 2/2000 | Dauerer et al. | 715/207 |
| 6,029,175 | A | * | 2/2000 | Chow et al. | 1/1 |
| 6,049,812 | A | * | 4/2000 | Bertram et al. | 715/205 |
| 6,112,202 | A | * | 8/2000 | Kleinberg | 1/1 |
| 6,125,361 | A | * | 9/2000 | Chakrabarti et al. | 1/1 |
| 6,154,752 | A | * | 11/2000 | Ryan | 715/202 |
| 6,175,862 | B1 | * | 1/2001 | Chen et al. | 709/218 |
| 6,667,751 | B1 | * | 12/2003 | Wynn et al. | 715/833 |
| 2002/0054138 | A1 | | 5/2002 | Hennum | |
| 2002/0180786 | A1 | | 12/2002 | Tanner | |
| 2005/0149576 | A1 | | 7/2005 | Marmaros et al. | |
| 2005/0154746 | A1 | | 7/2005 | Liu et al. | |
| 2006/0101003 | A1 | | 5/2006 | Carson et al. | |

FOREIGN PATENT DOCUMENTS

WO  2005066846 A  7/2005

OTHER PUBLICATIONS

Extended European Search Report dated May 14, 2008 issued by the European Patent Office relating to European Patent Application No. 08152120.5.
European Examination Report dated Apr. 27, 2009 issued by the European Patent Office relating to European Patent Application No. 08152120.5.
Canadian Office Action dated Jun. 30, 2011 issued by the Canadian Intellectual Property Office relating to Canadian Patent Application No. 2,656,338.

* cited by examiner

Primary Examiner — Laurie Ries
(74) Attorney, Agent, or Firm — Moffat & Co.

(57) ABSTRACT

A method is provided for processing a Web page for display on a device in communication with a server when the Web page is selected by a user clicking on a hyperlink. The method comprises the following steps. Text associated with a link label of the hyperlink is stored. The stored text is used to identify a relevant portion of the Web page that is desired by the user. At least a portion of a Web page identified by a link destination of the hyperlink is retrieved. The relevant portion of the Web page is presented to the user. A computer readable medium comprising instructions for executing the method and a computing device configured to execute the instructions are also provided.

20 Claims, 3 Drawing Sheets

ENHANCED BROWSER NAVIGATION

CROSS-REFERENCE TO RELATED APPLICATIONS

This application is a continuation of earlier application having application Ser. No. 12/040,417 filed Feb. 29, 2008 now U.S. Pat. No. 8,201,075, granted on Jun. 12, 2012 and claims priority under 35 U.S.C. 120 thereto. The disclosure of aforementioned application Ser. No. 12/040,417 is hereby incorporated by reference in it's entirety.

FIELD

This present disclosure relates generally to browsers and specifically to a method for providing enhanced browser navigation.

BACKGROUND

Proliferation of the Internet has led to a wide spread use of Internet or Web browsers configured to readily access information and present it to a user. As technology improves, browsers are being made available on an increasing number of devices including, for example, Internet-based appliances, in-vehicle navigation systems, and mobile devices, such as cell phones and portable digital assistants (PDAs), and the like.

Browsers allow users to navigate to a Web site by entering a Uniform Resource Locater (URL) associated with a Web page. Alternatively, users may be directed to a Web page by clicking on a hyperlink. When the user clicks on the hyperlink, the user is automatically directed to the Web page.

When clicking on a hyperlink for a given section, the user typically wishes to be directed immediately to that section or frame when the new Web page is loaded. Often the new Web page will include a number of header images and frames.

If the user is using the browser on a typically sized notebook or personal computer display, the desired section is usually displayed right away. However, if the user is using the browser on a device having a limited screen size, such as a mobile device, or if the page size is large, this is not necessarily the case. Rather, header images and frames loaded by the browsers may be displayed to the user ahead of the desired information. Accordingly, depending on the number of images and frames, as well as their configuration, users may have to scroll down a significant amount before reaching the desired section.

Accordingly, it can be seen that there is a need for solution that helps users of devices having a limited screen size, or users retrieving large pages, reduce the amount of scrolling that is required to reach a desired section of a Web page.

BRIEF DESCRIPTION OF THE DRAWINGS

Embodiments will now be described by way of example only with reference to the following drawings in which.

DETAILED DESCRIPTION OF THE PREFERRED EMBODIMENTS

In accordance with one embodiment there is provided a method for processing a Web page for display on a device in communication with a server when the Web page is selected by a user clicking on a hyperlink, the method comprising the steps of: storing text associated with a link label of the hyperlink; retrieving at least a portion of a Web page identified by a link destination of the hyperlink; using the stored text to identify a relevant portion of the Web page that is desired by the user; and presenting the relevant portion of the Web page to the user.

In accordance with another embodiment there is provided a computer readable medium comprising instructions for execution on a computing device when a Web page is selected by a user clicking on a hyperlink, the instructions causing the computing device to implement the steps of: storing text associated with a link label of the hyperlink; retrieving the Web page identified by a link destination of the hyperlink; using the stored text to identify a relevant portion of the Web page that is desired by the user; and presenting the relevant portion of the Web page to the user.

In accordance with another embodiment there is provided a computing device configured to retrieve a Web page in response to a user clicking on a hyperlink, the computing device including memory configured to store applications and data, and a processor configured to implement the steps of: storing text associated with a link label of the hyperlink; retrieving the Web page identified by a link destination of the hyperlink; using the stored text to identify a relevant portion of the Web page that is desired by the user; and presenting the relevant portion of the retrieved Web page to the user.

Figure 1:
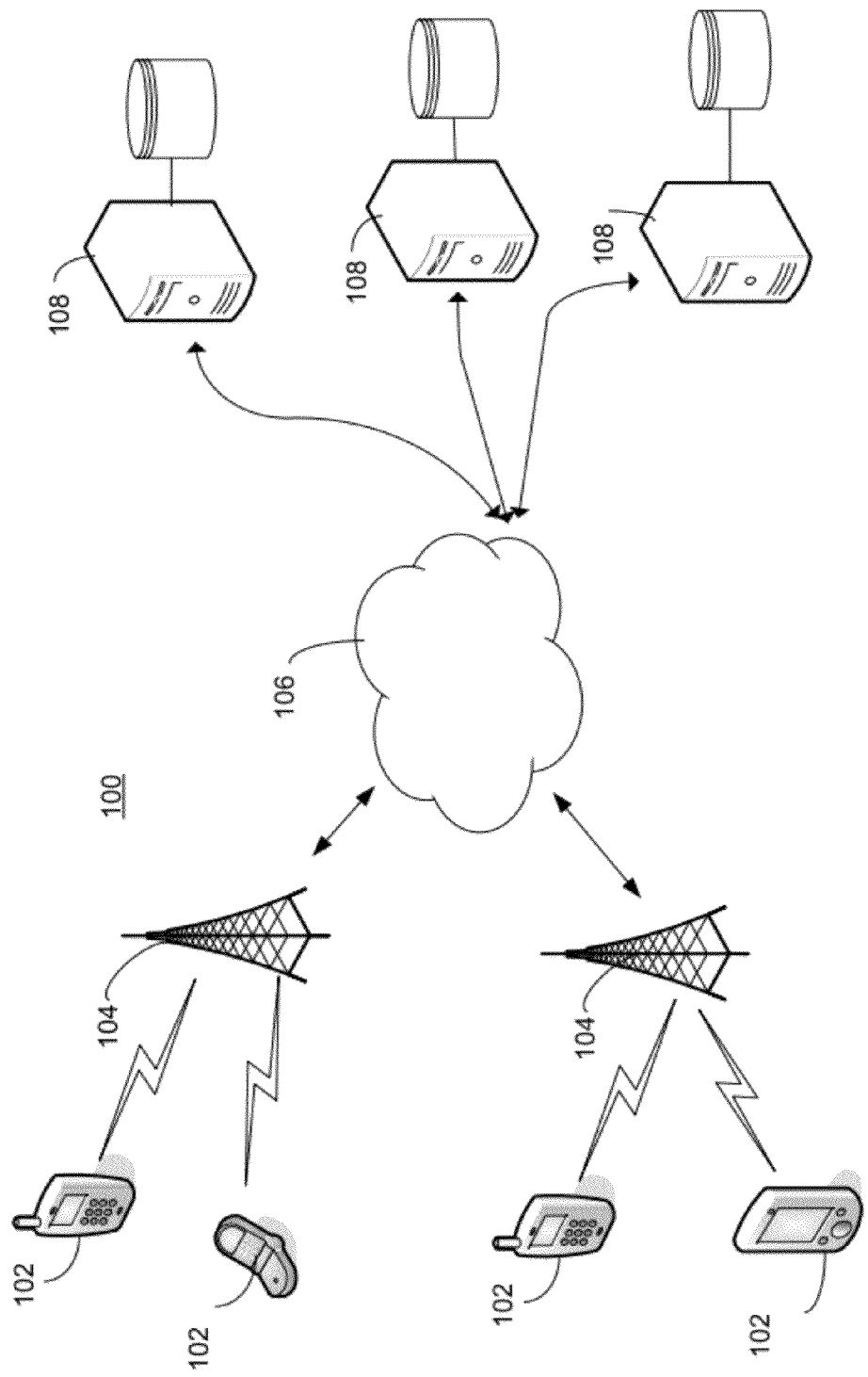
FIG. 1 is a diagram illustration a typical telecommunication infrastructure.

For convenience, like numerals in the description refer to like structures in the drawings. Referring to FIG. 1, a typical telecommunication infrastructure is illustrated generally by numeral 100. The telecommunication infrastructure 100 includes a plurality of mobile devices 102, a plurality of base stations 104, a communication network 106 and a plurality of network servers 108.

The mobile devices 102 include wireless computing devices such as a smart phone, a personal digital assistant (PDA) and the like. The mobile devices 102 are in communication with one of the base stations 104. The base stations 104 relay data between the mobile devices 102 and the network servers 108 via the communication network 106. Accordingly, the communication network 106 may include several components such as a wireless network, a relay, a corporate server and/or a mobile data server for relaying data between the base stations 104 and the network servers 108. The network servers 108 include servers such as a Web server, an application server, and an application server with web services.

It will be appreciated by a person of ordinary skill in the art that the telecommunication infrastructure 100 described herein is exemplary and that changes may be made to one or more components to accommodate different network configurations without affecting the scope of the invention described and claimed herein. Further, although the present description specifically recites a mobile device 102, it will be appreciated that other types of devices, including both wired and wireless devices, may similarly be employed.

Figure 2:
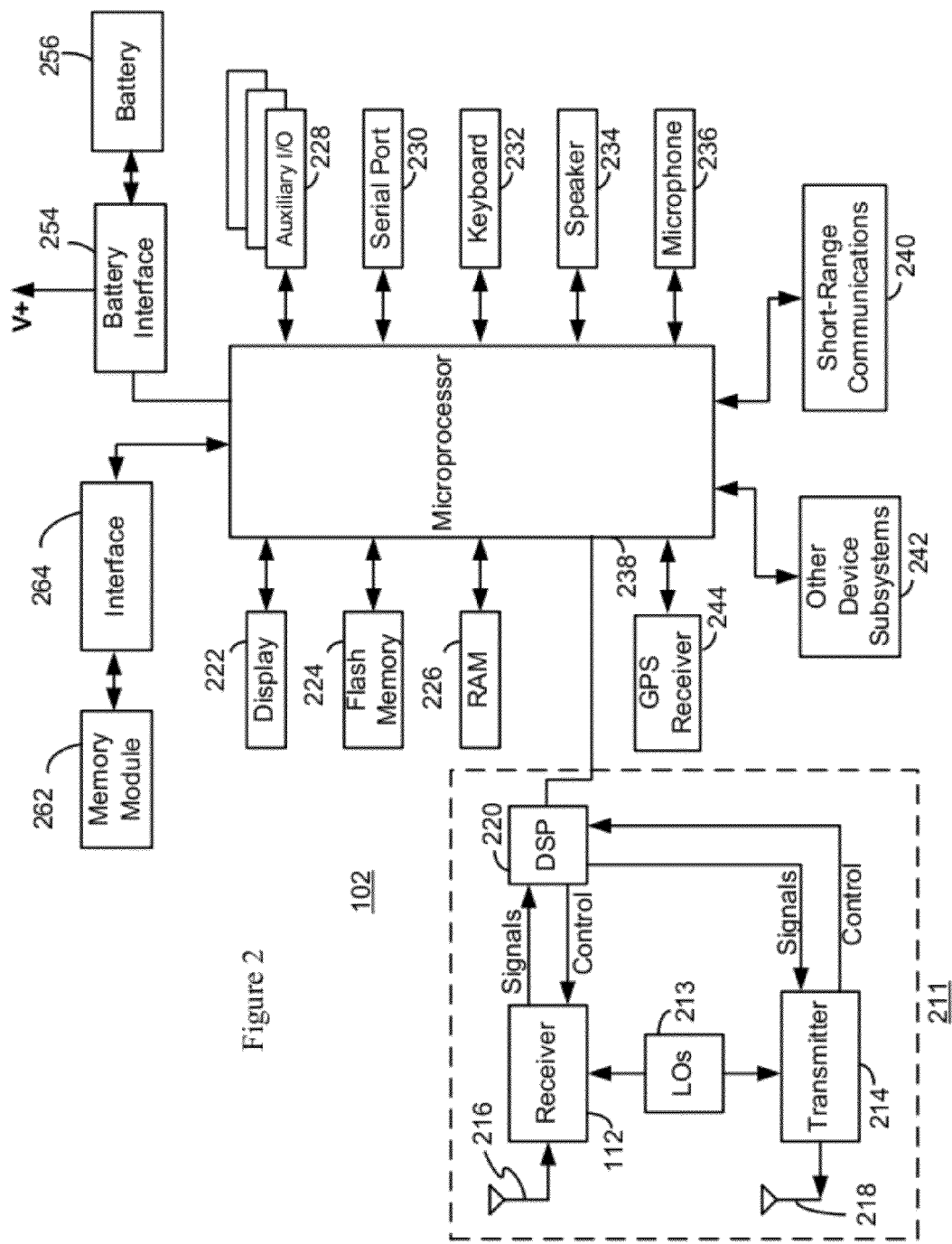
FIG. 2 is a block diagram of a mobile device.

Referring to FIG. 2, the mobile device 102 is illustrated in greater detail. The mobile device 102 is often a two-way communication device having both voice and data communication capabilities, including the capability to communicate with other computer systems. Depending on the functionality provided by the mobile device 102, it may be referred to as a data messaging device, a two-way pager, a cellular telephone with data messaging capabilities, a wireless Internet appliance, or a data communication device.

The mobile device 102 includes a communication subsystem 211, which includes a receiver 212, a transmitter 214, and associated components, such as one or more embedded or internal antenna elements 216 and 218, local oscillators (LOs) 213, and a processing module such as a digital signal processor (DSP) 220. As will be apparent to those skilled in field of communications, the particular design of the communication subsystem 211 depends on the communication network in which mobile device 102 is intended to operate.

The mobile device 102 includes a microprocessor 238 which controls general operation of the mobile device 102. The microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240 such as Bluetooth™ for example, and any other device subsystems or peripheral devices generally designated at 242. The mobile device 102 may also include a positioning device 244, such as a GPS receiver for example, for receiving positioning information.

Operating system software used by the microprocessor 238 is preferably stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, preferably enables execution of software applications on the mobile device 102. A predetermined set of applications, which control basic device operations, is installed on the mobile device 102 during its manufacture. These basic operations typically include data and voice communication applications, for example. Additionally, applications may also be loaded onto the mobile device 102 through the network 106, an auxiliary I/O subsystem 228, serial port 230, short-range communications subsystem 240, or any other suitable subsystem 242, and installed by a user in RAM 226, or preferably the persistent store 224, for execution by the microprocessor 238. Such flexibility in application installation increases the functionality of the mobile device 102 and may provide enhanced on-device features, communication-related features, or both.

The display 222 is used to visually present an application's graphical user interface (GUI) to the user. The user can manipulate application data by modifying information on the GUI using an input device such as the keyboard 232 for example. Depending on the type of mobile device 102, the user may have access to other types of input devices, such as, for example, a scroll wheel, trackball, light pen or touch sensitive screen.

In accordance with the present embodiment, a link application is installed on the mobile device 102. The link application can be implemented as a standalone, or plug-in, application that interfaces with a pre-existing browser, or it's functionality can be incorporated into the browser itself, as will be appreciated by a person of ordinary skill in the art. Further, as will be appreciated from the following description, the link application improves the likelihood that a user of the mobile device 102 will be presented with the desired portion of a Web page after selecting the Web page using a hyperlink. In the present embodiment, the hyperlink clicked by the user is a hypertext element.

As is known in the art, a typical Hypertext Mark-up Language (HTML) hyperlink element is specified using the anchor, or <a>, element. The anchor element includes several attributes including, for example, a link destination, link label, link title, link target, and link class or link identifier. The anchor element takes the form:

<a href="URL"title="link title"target="link target"class="link class">link label</a>

The link destination is identified by the URL pointed to by href. The link label is the anchor text of the hyperlink that is visible to the user. For example, consider a simple Web page in which a hyperlink is provided to another Web page.

<a href="http://www.rim.com/">Research in Motion</a>

The link destination, http://www.rim.com/, identifies the target Web page addressed by the hyperlink. The link label, Research in Motion, identifies the "clickable" text that is visible to the user. Accordingly, if the user clicks on the text of the link label, Research in Motion, the user is directed to the address, http://www.rim.com, defined by the link destination. It will be appreciated that the example given is a simple example for illustrative purpose only.

Figure 3:
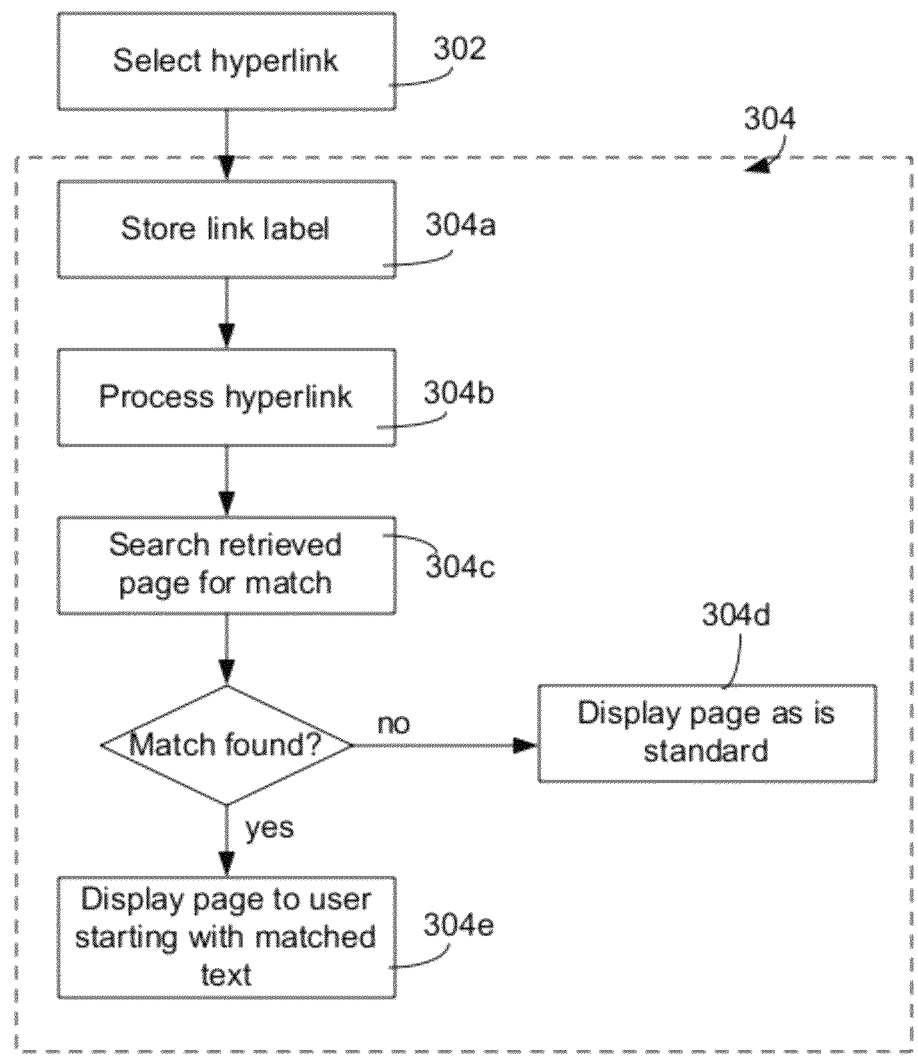
FIG. 3 is a flow diagram illustrating the steps for displaying a web page in accordance with an embodiment of the invention.

Referring to FIG. 3, a flow chart illustrating the operation of the link application is shown generally by numeral 300. At step 302, the user clicks on a hyperlink to a Web page. The hyperlink clicked by the user can be found in a number of different sources, including, for example, an e-mail, an electronic document, or a Web page, as will be appreciated by a person skilled in the art.

At step 304, the link application processes the hyperlink. Specifically, at step 304*a*, the link application stores the link label of the hyperlink.

At step 304*b*, the browser processes the hyperlink as is standard in the art. During this step the Web page defined by the link destination of the hyperlink is retrieved for display to the user. As will be appreciated by a person skilled in the art, how the Web page is presented depends on a number of factors, including attributes of the anchor element, all of which can be implemented using known or proprietary methods.

At step 304*c*, once the Web page has been retrieved, the link application searches the text of the retrieved Web page for a match to the link label. In one implementation, the link application searches the text of the retrieved Web page for an exact match to the link label. However, it will be appreciated that the text in the retrieved Web page may not match exactly with the link label. Accordingly, in another implementation, the link application searches the text of the retrieved Web page for a partial match to the link label. In this implementation, the link application can be configured to consider the closest matching text as a match to the link label. Alternatively, if the relevancy of the closest matching text does not meet a predefined threshold, the link application can be configured to consider there to be no matching text.

If a match is not found, the link application continues to step 304*d*. At step 304*d* the retrieved Web page is displayed as is standard in the art and the stored link label is erased.

If a match is found, the link application continues to step 304*e*. At step 304*e*, the retrieved Web page is displayed to the user such that the matching text begins near the top of the display when the retrieved Web page is displayed to the user. In the present embodiment, this is achieved by automatically scrolling the Web page to the matching text. The Web page may be scrolled to the matching text prior to displaying the Web page, while displaying the Web page, or after displaying the Web page. The stored link label is erased as it is no longer required.

Accordingly it will be appreciated that when the link label matches text in the retrieved Web page, the Web page can be automatically scrolled to the proper position even before the Web page is displayed to the user.

Consider the following example. The user logs on to CNN's Web site at www.cnn.com. The user scrolls to the "Latest News" section. At step 302, the user clicks on a news story identified by the headline "Senators wary of 'amnesty' in Iraq plan", which is a hypertext element.

At step 304a, the link application stores the text "Senators wary of 'amnesty' in Iraq plan" of the link label. At step 304b, the browser processes the request for the Web page associated with the link destination of the hypertext element and retrieves the Web page for display.

At step 304c, the link application searches the text of the retrieved Web page for the text "Senators wary of 'amnesty' in Iraq plan". Since the headline of the story is often included as the first line of the story on the retrieved Web page, it is likely that a match will be found. Accordingly, at step 304e, the link application automatically scrolls the retrieved Web page so that the text "Senators wary of 'amnesty' in Iraq plan" is at the top of the screen when the Web page is displayed to the user.

The link application can be configured to be either enabled or disabled. For example, browser options may be configured to allow the user to select whether or not the link application will be active. Alternatively, the link application may be enabled by the user activating a hot key when the Web page is loading. In this example, the link application stores the link label in case the user activates the hot key. If the hot key is activated, the link application displays the Web page as described with reference to FIG. 3. If the hot key is not activated the Web page is displayed as is standard in the art.

In the embodiment described above, relevant information on the Web page is displayed to the user by automatically scrolling to the text identified by the link label. In an alternate embodiment, once a correct frame is identified by the link application, rather than automatically scrolling to the correct frame, the remaining frames are discarded. Discarding the remaining frames will have a similar effect to automatically scrolling the screen, since it will display the relevant information at or near the top of the screen. However, in the present embodiment, the user will not have access to the discarded frames.

Alternatively, rather than discard the frames that are not identified as containing the relevant text, the irrelevant frames are simply ignored by the link application. In this embodiment the user is given the option of displaying the entire Web page, including the "irrelevant" frames if the user so desires. This feature may be facilitated by providing the user with a hot key or menu option. Therefore, if the link application errs in determining the relevant frame, the user can still choose to be presented with the entire Web page, without having to retrieve it again.

In yet an alternate embodiment, the server 108 is configured to implement the link application as well as the mobile device 102. In this embodiment, the link application executing on the device sends the link label to the server 108 along with the link destination in the request for the Web page. Once the server 108 has retrieved the Web page, the link application executing on the server 108 determines which of the frames in the retrieved Web page includes the text identified by the link label. Once the appropriate frame is identified, the link application executing on the server 108 determines which of the frames to return the mobile device 102. In the present embodiment only the frame including the relevant information is returned. In an alternate embodiment, a plurality of frames are returned if, for example, the link label matches text in a plurality of frames. In yet an alternate embodiment, any number of the frames are transmitted to the device 102, however the frames are reordered by the server so that the most relevant frames are sent first.

Although the description relates specifically to mobile devices having a limited screen size, it will be readily apparent to a person of ordinary skill in the art that the same may be applied to a notebook or desktop computer for facilitating large pages. Accordingly, although the invention has been described with reference to certain specific embodiments, various modifications thereof will be apparent to those skilled in the art without departing from the scope of the invention as defined by the appended claims.

The invention claimed is:

1. A method for processing a Web page addressed by a link destination of a hyperlink provided at a device, the method comprising:
   in response to selecting the hyperlink, storing a text portion of the hyperlink;
   retrieving at least a portion of the Web page; and
   identifying at least one frame in the portion of the Web page matching the stored text portion of the hyperlink.

2. The method of claim 1, further comprising presenting a beginning of the frame on a display of the device.

3. The method of claim 2, wherein presenting the frame comprises presenting the Web page and automatically scrolling the Web page until the beginning of the frame is presented.

4. The method of claim 2, wherein presenting the relevant portion comprises presenting the Web page starting at the beginning of the relevant portion, without scrolling the Web page.

5. The method of claim 1 further comprising identifying the beginning of the Web page if the Web page does not include a match with the stored text.

6. The method of claim 5, further comprising presenting the beginning of the Web page in response to a predetermined signal.

7. The method of claim 6, wherein the predetermined signal is activation of a hotkey.

8. The method of claim 1, wherein the matching comprises a partial matching.

9. The method of claim 8, wherein the partial matching exceeds a predefined relevance threshold.

10. The method of claim 1, wherein identifying the relevant portion of the Web page is performed by a server in communication with the device.

11. The method of claim 10, wherein the server reorders frames in the Web page in accordance with the relevant portion.

12. The method of claim 11, wherein the server transmits to the device only the frame identified in the portion of the Web page.

13. The method of claim 11 wherein the server transmits to the device only the portion of the Web page.

14. A computer readable memory comprising instructions for execution on a computing device for processing a Web page addressed by a hyperlink provided at the computing device, the instructions causing the computing device to:
   in response to selecting the hyperlink, store a text portion of the hyperlink;
   retrieve at least a portion of the Web page; and
   identify at least one frame in the portion of the Web page matching the stored text portion of the hyperlink.

15. The computer readable memory of claim 14, comprising further instructions for presenting a beginning of the frame on a display of the device.

16. The computer readable memory of claim 15, wherein the match is a partial match.

17. The computer readable memory of claim 16, wherein the partial match exceeds a predefined relevance threshold.

18. The computer readable memory of claim 16, further comprising presenting the frame by automatically scrolling until the beginning of the frame is presented.

19. The computer readable memory of claim 16, wherein presenting the frame in the Web page without scrolling.

20. A computing device configured to process a Web page addressed by a hyperlink, the computing device including a display, memory configured to store applications and data, and a processor configured to:
- in response to selecting the hyperlink, store a text portion of the hyperlink;
- retrieve at least a portion of the Web page; and
- identify at least one frame in the portion of the Web page matching the stored text portion of the hyperlink.

* * * * *